United States Patent [19]

Singh et al.

[11] 4,285,099
[45] Aug. 25, 1981

[54] SQUID PROCESSING MACHINE

[75] Inventors: Rajinder P. Singh; Daniel E. Brown, both of Davis, Calif.

[73] Assignee: The Regents of the University of California, Berkeley, Calif.

[21] Appl. No.: 65,538

[22] Filed: Aug. 10, 1979

[51] Int. Cl.³ .................................................. A22C 25/14
[52] U.S. Cl. .......................................... 17/53; 17/58
[58] Field of Search ..................... 17/53, 58, 65, 51; 134/134, 149, 153, 170

[56] References Cited

U.S. PATENT DOCUMENTS

| | | | |
|---|---|---|---|
| 1,853,328 | 4/1932 | Youman | 17/58 |
| 1,900,267 | 3/1933 | Youman | 17/58 |
| 2,493,291 | 1/1950 | Hirsch | 134/149 X |
| 2,951,490 | 9/1960 | Cuillier | 134/149 X |

FOREIGN PATENT DOCUMENTS

| | | | |
|---|---|---|---|
| 422969 | 7/1972 | U.S.S.R. | 17/53 |
| 584834 | 12/1977 | U.S.S.R. | 17/58 |
| 596205 | 3/1978 | U.S.S.R. | 17/53 |

*Primary Examiner*—Willie G. Abercrombie
*Attorney, Agent, or Firm*—Lothrop & West

[57] ABSTRACT

A squid processing machine supports and specially positions a squid. The squid is treated by being severed into three longitudinally separate tentacle, eye or head, and body portions. The tentacle portion is released into one zone and the eye portion is released into another zone. The body portion is impaled on a peg and is rotated and subjected to external water jets that remove the skin, which is discarded, and to internal water jets that remove the viscera, which are discarded. The remaining body portion is ejected from the peg and is directed away from the treatment portion of the machine.

18 Claims, 3 Drawing Figures

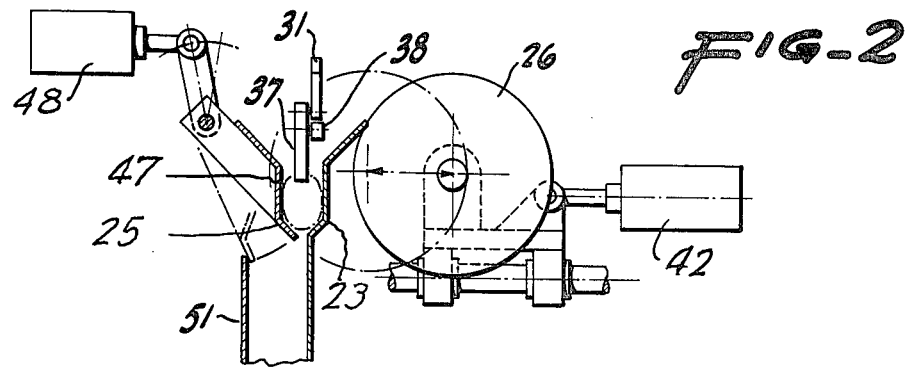
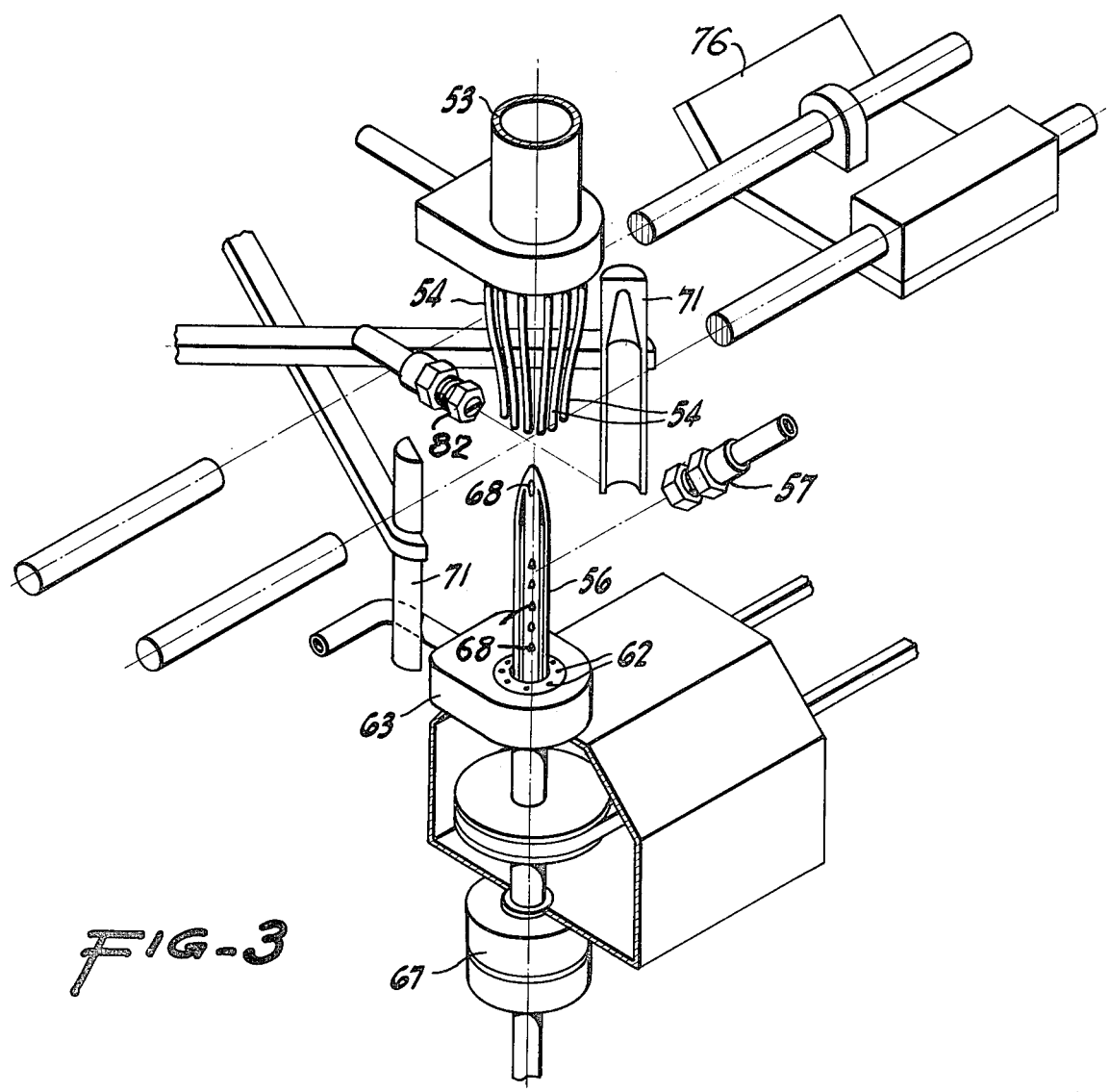

SQUID PROCESSING MACHINE

The Government has rights in this invention pursuant to Grant No. 04-7-158-44121 awarded by the U.S. Department of Commerce.

CROSS-REFERENCES TO RELATED APPLICATIONS

None.

BRIEF SUMMARY OF THE INVENTION

An individual squid, particularly of the sort found in this country, is received in a machine, is appropriately oriented, and is then severed into three portions, separating the tentacles, the eye portion, and the body portion. The tentacles are segregated in one area, the eye portion is discarded, and the body portion is then impaled on a rotary spindle or peg and while rotated is subjected to forceful water jets to strip the skin from the body portion. Additionally, the body portion is subjected to powerful internal water jets which dislodge and wash away the viscera. The remaining body portion is ejected from the peg by water jets and is deflected into a discharge portion of the machine.

BRIEF DESCRIPTION OF THE SEVERAL VIEWS OF THE DRAWINGS

FIG. 2 is a transverse section through the severing portion of an actual machine, some portions being diagrammatic.

FIG. 3 is an isometric diagram, portions being broken away, of the skinning portion of the machine.

DETAILED DESCRIPTION

Figure 1:
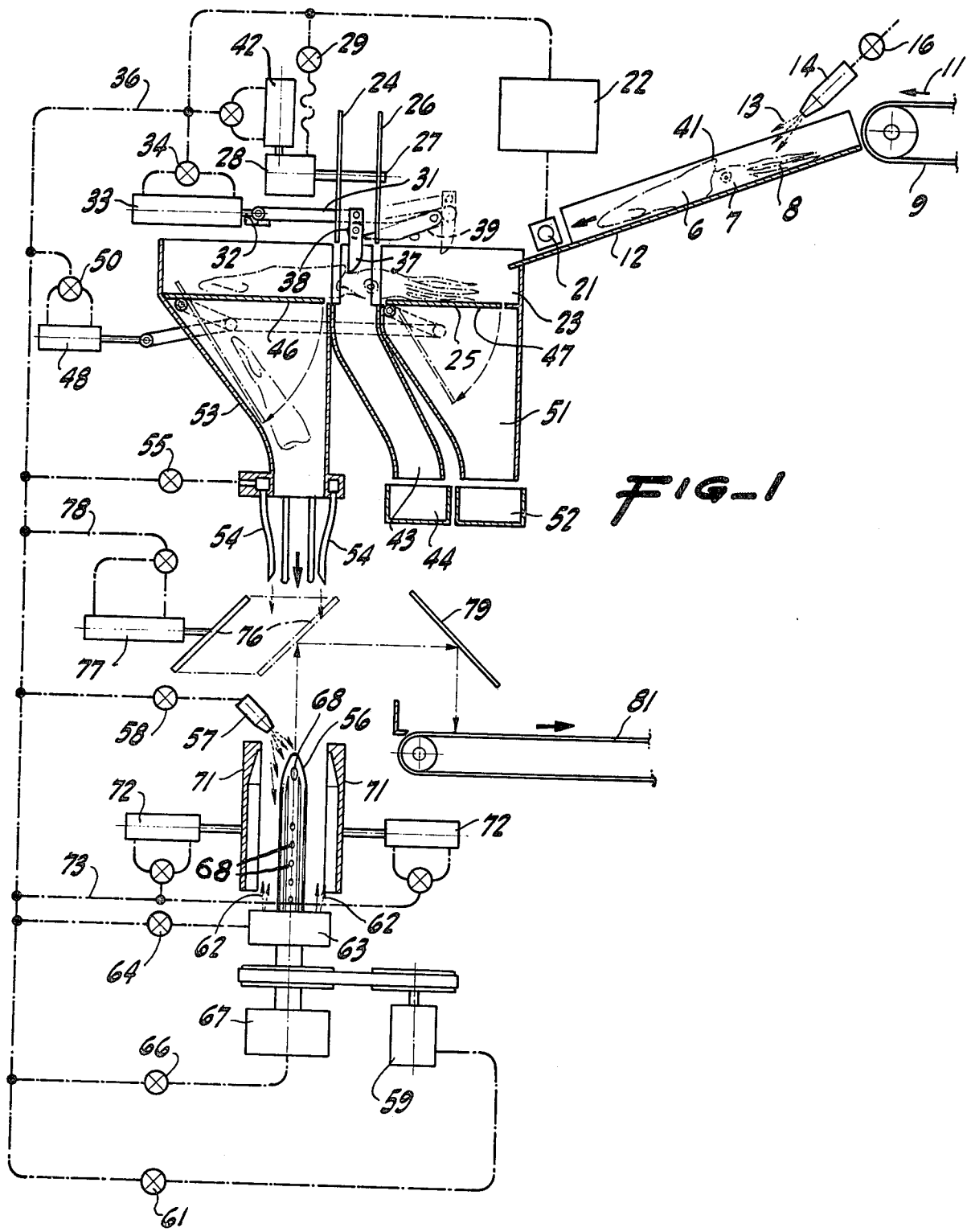
FIG. 1 is a diagram of the squid processing machine pursuant to the invention.

While the squid processing machine pursuant to the invention can be embodied in a number of different ways, depending somewhat in proportions and sizes on the particular variety of squid to be processed, it has with considerable success been embodied as shown herein for use with squid found in waters off of the United States. The machine is illustrated herein generally in a diagrammatic fashion, although some of the figures or parts of them are literal. The same reference numerals are used in the figures for both the diagrammatic and literal parts. As especially shown in the diagrammatic FIG. 1, the squid subjected to machine treatment is simply characterized as having a body portion 6, an eye or head portion 7, and a tentacle portion 8.

A squid of this nature is introduced into the machine on a feed conveyor 9 advanced in the direction of the arrow 11 and is discharged onto an inclined trough 12. The trough portion of this device is based on previous work as reported in a thesis "Development and Testing of a Device to Automatically Clean California Market Squid" written by L. A. Brooks for a MS degree and deposited in the Library of the University of California, Davis, Calif. on Sept. 9, 1977.

A water spray 13 is directed onto the trough 12 from a plurality of nozzles 14 controlled by a valve 16. The valve is normally opened when the machine operation starts in general, so that there is a generally continuous water bath or water film on the feeding or orientation trough 12. The spray has some force so that not only does gravity assist in feeding the squid in a generally leftward direction in the figure and downwardly, but also permits the advancing and descending squid to orient, as it does, by turning on the incline 12, largely due to the dragging effect of the tentacles. No matter how the squid is discharged thereonto, this feed arrangement results in the squid turning into an orientation with the body portion 6 leading in the direction of advance and with the body of the squid generally parallel to the general direction of advance.

As the squid advances toward the left in the figure with the body portion leading, the squid eventually passes an electric eye mechanism 21 that sends a responsive impulse to a program device 22. The device 22 has the effect of energizing much of the remaining part of the structure and of timing the remaining part of the structure especially to accommodate or follow the program initiated by the entering squid. For example, the squid arrives in a generally horizontal receiving trough 23 having a somewhat interrupted bottom or wall portion 25 and movable to serve as a cooperating holding and releasing member for the squid severing structure.

The severing structure includes a pair of rotary knives or saws 24 and 26 on an arbor 27 driven by a motor 28. The knives are normally to one side of or above the trough 23 and can be moved transversely, through slots, to span the trough. While pneumatic, hydraulic or electric power can be utilized, and the accompanying diagram does not distinguish between them, it is often convenient to utilize pneumatic power for many of the instrumentalities. The motor 28, for example, is a pneumatic motor appropriately supplied and energized through a control valve 29 regulated by the programmer 22. One of the effects of the passage of the squid by the electric eye 21 is to supply energy through the valve 29 to the motor 28 and so to start the knives 24 and 26 rotating.

To position the squid body properly and in the location desired for the cutting thereof into sections, the trough 23 is augmented by or is provided with a positioning arm 31. This preferably is an extremity of a reciprocating rod 32 moved by a cylinder 33 having a control 34 joined to the control circuit 36 or program line of the programmer 22. The positioning arm includes a hook 37 or hooks, sometimes simply pins, preferably pivoted on the rod 32 and in one position, shown in dotted lines in FIG. 1, having a roller 38 riding up an upwardly pivoting and downwardly stopped ramp 39 on the frame so that the projected hook is initially out of the way of the advancing squid. However, after the passing squid has actuated the electric eye 21, the programmer energizes the cylinder 33 so that the positioning hook 31 is moved from its right-hand position to its left-hand position. In so moving, the hook 37 engages against the outstanding ring 41, rim or fold at the forward end of the exterior of the squid body and immediately behind the squid eye portion 7.

As the hook 37 in engagement with the ring 41 moves toward the left in the figure, it advances the squid in the trough 23 until the hook stops in a predetermined position with the squid ring 41 in precise location between the plane knives 24 and 26 and preferably closely adjacent to the knife 24. In that position, the hook stops for a predetermined time and is programmed to return later to its initial position out of the way of the next advancing squid but in location to repeat the positioning operation.

Since the squid has been accurately positioned in the trough and since the knives are rotating, a command from the programmer 22 is effective upon a knife positioning cylinder 42 to move the knives transversely of the trough 23. This causes them, while rotating, to pass through the squid, thus dividing it into the separate body portion 6, the separate eye portion 7, and the separate tentacle portion 8. While in some respects the relative knife position is not critical, it is important to locate the body cutting knife a short distance (say, ⅛" to ½") from the edge of the ring and body opening. This facilitates the skinning, backbone removal and eviscerating operations, since a cut in this location also cuts off the tip of the backbone and the portion of the skin near the opening, where both are most strongly attached. The body opening is more easily detected and used as a datum since the receiving trough 23, when in holding or clamping position, is relatively narrow or close-fitting and tends to induce enlargement of the body opening. The hook or hooks 37 on the arm 31 thus are able easily to engage the edge or ring 41 of the body opening.

The bottom of the trough 23 beneath the eye portion can readily be omitted, so that, when severed, the eye portion falls by gravity into a conveying chute 43 and falls downwardly into a receptacle 44 for subsequent disposition.

After the squid is separated into the three separate portions and the central portion falls to the receiver 44, the two remaining portions of the squid are released. This is done by their respective wall supports 25, including some bottom supports 46 and 47. These are withdrawn by their actuating cylinder 48 supplied through a valve control 50 according to the programmer 22 so that support swings downwardly. As the support 47 descends, the severed squid tentacle portion falls downwardly through a guide enclosure 51 into a receptacle 52. This retains the assembled or collected tentacle portions 8 of successive squid. The received tentacles can be taken away from the rest of the machine and separately treated.

At about the same time, the body portion 6 of the squid is released by its gate 46 and falls through a downwardly converging guide 53. The initially horizontal severed body portion falls downwardly and is turned by contact with the guide wall to assume substantially a vertical position with the cut portion of the squid body lowermost.

The vertically descending body portion of the squid travels straight downwardly and drops between a number or ring of downwardly directed nozzles 54 or jets. The nozzles 54 apppropriately release water with considerable force and under control of a valve 55 opened or timed through the line 36.

The partially exteriorly washed body portion is thus positively driven vertically downwardly by the jets from the nozzles 54 to engage over and to impale itself upon a vertically set, tapered end, hollow peg 56 or nozzle. This is designed to be symmetrical about and to occupy a position along a vertical axis generally in alignment with the axis of the discharge of the guide 53. The cavity of the body 6 then fits over and onto the hollow peg 56 which is especially sized and contoured to fit the enveloping squid body cavity. The body 6 is urged onto the peg and to engage the peg with close proximity by the several downwardly directed water jets 54. The effect is to seat and retain the body 6 on the peg 56 for rotation therewith.

The tapered, hollow peg 56 is then rotated about its own axis by means of a motor 59 controlled by a switch 61 or valve connected to the control or program line 36. As the page 56 is rotated, the impaled squid body 6 is likewise rotated and is also subjected to bathing and strong impact by water jets 57, preferably of a fan shape. The jet 57 (or jets) is under the control of a valve 58 in turn regulated by the program line 36. The effect is for the water jets from the nozzles 57 to impinge upon the external skin of the body 6 and to dislodge and wash such skin away therefrom, in an even fashion, leaving the body flesh externally exposed. The rapid peg rotation assists in dissipating the loosened skin by centrifugal force.

In addition, appropriate dislodging and washing water is controlled by a programmed valve 66 and flows through a rotary entry 67 into the interior of the hollow peg 56. That water emerges from apertures 68 in the peg to dislodge much of the interior material from within the body 6, especially including the viscera and backbone normally existing therein. In this fashion, the body portion 6, impaled upon the peg and rotating about the axis, is not only deprived of its external skin, but likewise is deprived of its interior viscera, backbone and related parts. The rotation of the peg 56 is completed after a limited time, but during the rotation thereof at about four hundred to a thousand rpm, the effect is for the exterior skinning jets to remove the skin and for the interior jets to remove the viscera, backbone, ink sac and the like from the interior of the body portion of the squid, leaving the interior and exterior of the body stripped and clean.

The interior evisceration of the body portion of the squid can be well accomplished after stopping of the rotary motion of the body during which the outer skin has been removed. There is then an external grasping of the body portion or a clamping action effective to stop the rotation of the body portion. This is done by means of clamps 71 actuated by cylinders 72 joined to the control circuit 36 through a connector 73. In this fashion, the clamped squid body, while stationary, is gutted due to the continued relative rotary motion of the peg 56 and particularly because of water jets issuing from the apertures 68 supplied through the entry 67. In this way the viscera and waste are caused to detach and largely to be washed to discharge.

In any case, the net result of the operation upon the squid body while on the peg 56 or spindle is not only to remove the exterior covering of the squid body, but likewise to remove the interior, undesirable parts from the body portion.

At the conclusion of such operations, the clamps 71 are withdrawn. Additional water jets 62 then issue in an upward direction from a ring nozzle 63 under control of a valve 64 and, in turn, regulated by the program line 36. The effect is for these upward jets to dislodge or eject the remaining, treated portion of the squid body upwardly. The body rises with considerable force and contacts an interposed reflector 76. This is normally out of the way, but is moved into position by means of an actuator 77 connected by a line 78 to the control or program line 36. When the reflector 76 is temporarily in position intersecting the vertical axis of the structure, and when the treated body portion is ejected upwardly from the skinning and eviscerating peg 56, the ejected body is deflected off of the reflector 76, and toward the right in the figure, by a nozzle 82 (FIG. 3). The deflected body encounters, if necessary, another reflector 79. The treated and discharged body portion lodges on a conveyor 81 and is so removed from the active portion of the machine.

In this fashion, the body portion of the original squid, having been deprived of its skin and having been deprived of its internal organs, is discharged from the machine on the conveyor 81 in condition for further handling.

All of the machine parts, having gone through their controlled and timed cycles, are back in their original positions so that they are able to provide the same treatment to a subsequent squid coming into the machine from the belt 9 and therein being subjected to subsequent, similar treatment.

While but a single squid has been described as it is treated in going through the device, it will be recognized that devices to handle several squid simultaneously can be similarly provided and particularly a number of pegs in a single machine particularly if the skinning and eviscerating operations are substantially slower than the body severing or dividing operation.

We claim:

1. A squid processing machine for a squid having a body with an intermediate eye portion, an end tentacle portion and an end envelope portion having a skin with a circumferential rim comprising a frame; a substantially horizontal alignment trough on said frame and having a movable side wall; a feeding table on said frame directing a squid thereon into said alignment trough; means on said frame for engaging said circumferential rim on a squid in said alignment trough and moving said squid rim into a predetermined longitudinal position in said trough; a pair of knives on said frame movable across said trough on opposite sides of said predetermined longitudinal position to sever a squid therein into a separate intermediate eye portion, an end tentacle portion and an end envelope portion; means for moving said side wall to release said separate squid portions from said trough; means for conducting said eye portion from said trough; means for conducting said tentacle portion from said trough; a hollow peg; means for mounting said peg on said frame for rotation about an upright axis; means for directing said end envelope portion from said alignment trough into a substantially upright position with the severed end thereof down and in alignment with said peg; means for urging said substantially upright end envelope portion into impalement on said peg; means for rotating said peg and said end envelope portion therewith; means for projecting a water jet against said rotating end envelope portion to remove said skin therefrom; means for discharging said skinless end envelope portion from impalement on said peg.

2. A device as in claim 1 including means on said frame for receiving a skinless end envelope portion forced off of said peg by said forcing means.

3. A device as in claim 1 including means for holding said end envelope portion against rotation with said peg.

4. A device as in claim 1 including means establishing water jets issuing from said peg for removing material from within said end envelope portion.

5. A device as in claim 1 including means for holding said end envelope portion against rotation with said peg and for simultaneously establishing water jets issuing from said peg for removing material from within said end envelope portion.

6. A device as in claim 1 in which said feeding table is slanted downwardly toward said trough, and means discharges a water jet along said feeding table in the direction of said trough.

7. A device as in claim 1 in which said engaging means is a pin movable along the length of said trough from a position trailing said squid rim into a predetermined position between said knives.

8. A device as in claim 7 including an electric eye actuated by the presence of a squid on said feeding table for controlling said movable pin.

9. A device as in claim 1 including means for moving said knives across said trough in response to said rim-engaging pin in said predetermined longitudinal position.

10. A device as in claim 1 in which said means for moving said side wall to release said squid portions is effective upon severance of said squid portions by said knives.

11. A device as in claim 1 in which said means for directing said end envelope portion is a duct having a lower wall extending from a substantially horizontal portion into a substantially vertical portion.

12. A device as in claim 1 in which said means for urging impalement onto said peg includes means defining a plurality of water jets substantially surrounding and directed downwardly toward said peg.

13. A device as in claim 1 in which rotation of said peg is from about four hundred rpm to about one thousand rpm.

14. A device as in claim 1 in which said means for discharging said skinless envelope portion from said peg includes means defining a plurality of water jets directed upwardly around said peg.

15. A device as in claim 1 comprising means for engaging said rotating envelope portion and stopping said rotation of said envelope portion with said rotating peg.

16. A device as in claim 1 comprising means defining water jet openings in said peg directed to remove viscera, backbone and ink sac from an end envelope portion on said peg.

17. A device as in claim 1 comprising means effective upon an envelope portion dislodged from said peg for directing said dislodged envelope portion out of said processing machine.

18. Apparatus for processing the body portion of a squid comprising peg means sized and contoured to receive and fit into the body portion of a squid for retaining said body portion for rotation therewith, said peg means being hollow and including a radial flow passage communicating between its interior and exterior surfaces; means for injecting fluid under pressure into the interior of said peg means, thereby causing said fluid to issue radially from said peg means in the form of a high speed fluid jet from the external opening of said fluid flow passage; and clamping means disposed radially outward from said peg means and selectively movable between an open position and a body portion grasping position, said clamping means, in its body portion grasping position, being adapted to engage said body portion and arrest rotation thereof despite continued rotation of said peg means.

* * * * *